(12) United States Patent
Blake

(10) Patent No.: US 6,485,044 B1
(45) Date of Patent: Nov. 26, 2002

(54) BICYCLE STUNT PEGS FOR GRINDING

(76) Inventor: Patrick J. Blake, 566 Roses Mill Rd., Milford, CT (US) 06460

( * ) Notice: Subject to any disclaimer, the term of this patent is extended or adjusted under 35 U.S.C. 154(b) by 0 days.

(21) Appl. No.: 09/921,102

(22) Filed: Aug. 1, 2001

(51) Int. Cl.[7] ............................................... B60B 35/00
(52) U.S. Cl. .................. 280/288.4; 280/291; 301/110.5
(58) Field of Search ............................... 280/288.4, 291, 280/293, 304, 304.3, 304.5; 74/564; 296/75; 301/124.1, 110.5

(56) References Cited

U.S. PATENT DOCUMENTS

| | | | | |
|---|---|---|---|---|
| 625,368 A | * | 5/1899 | Thompson | 105/461 |
| 3,484,829 A | * | 12/1969 | Erickson | 280/291 |
| 5,524,918 A | * | 6/1996 | Peabody et al. | 280/291 |
| 5,884,983 A | * | 3/1999 | Wu | 301/110.5 |
| 6,070,897 A | * | 6/2000 | Hsieh et al. | 206/207 |
| 6,161,859 A | * | 12/2000 | Cheng | 280/291 |
| 6,199,887 B1 | * | 3/2001 | Lee | 280/288.4 |
| 6,247,761 B1 | * | 6/2001 | Lin | 301/124.1 |

* cited by examiner

Primary Examiner—F. Zeender
(74) Attorney, Agent, or Firm—Daniel Rubin; H. Dennis Kelly; Kelly & Hubbard

(57) ABSTRACT

A cylindrical peg adapted for side mounting on each axle of a bicycle to extend laterally outward therefrom for riding a rail when participating in the stunt of grinding. The peg includes a rotatable cover to effect a rolling mode on the rail and optionally may include a detent to convert the cover from a rolling mode to a fixed mode by securing the cover against rotation.

6 Claims, 3 Drawing Sheets

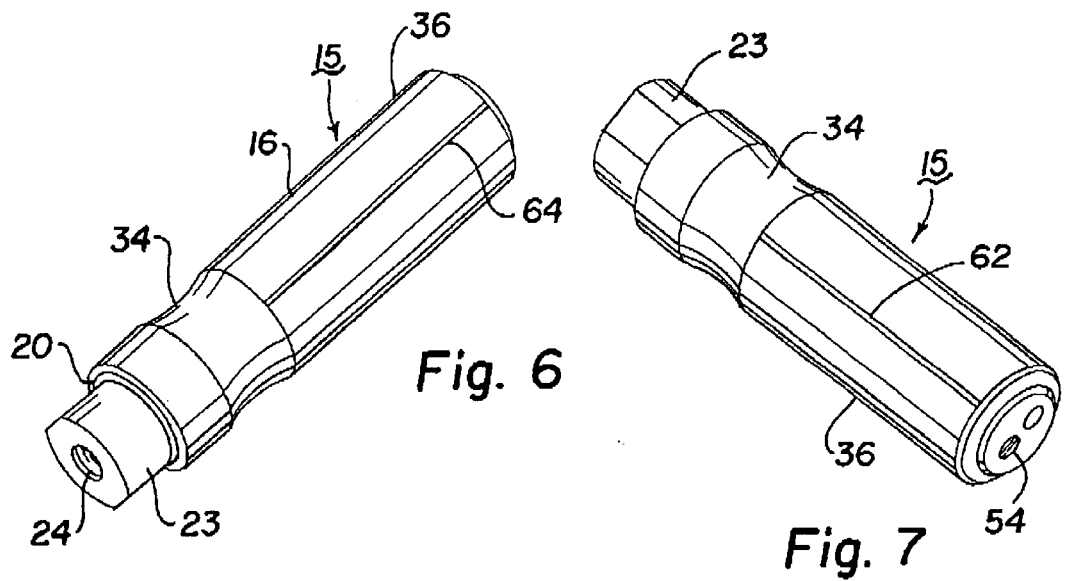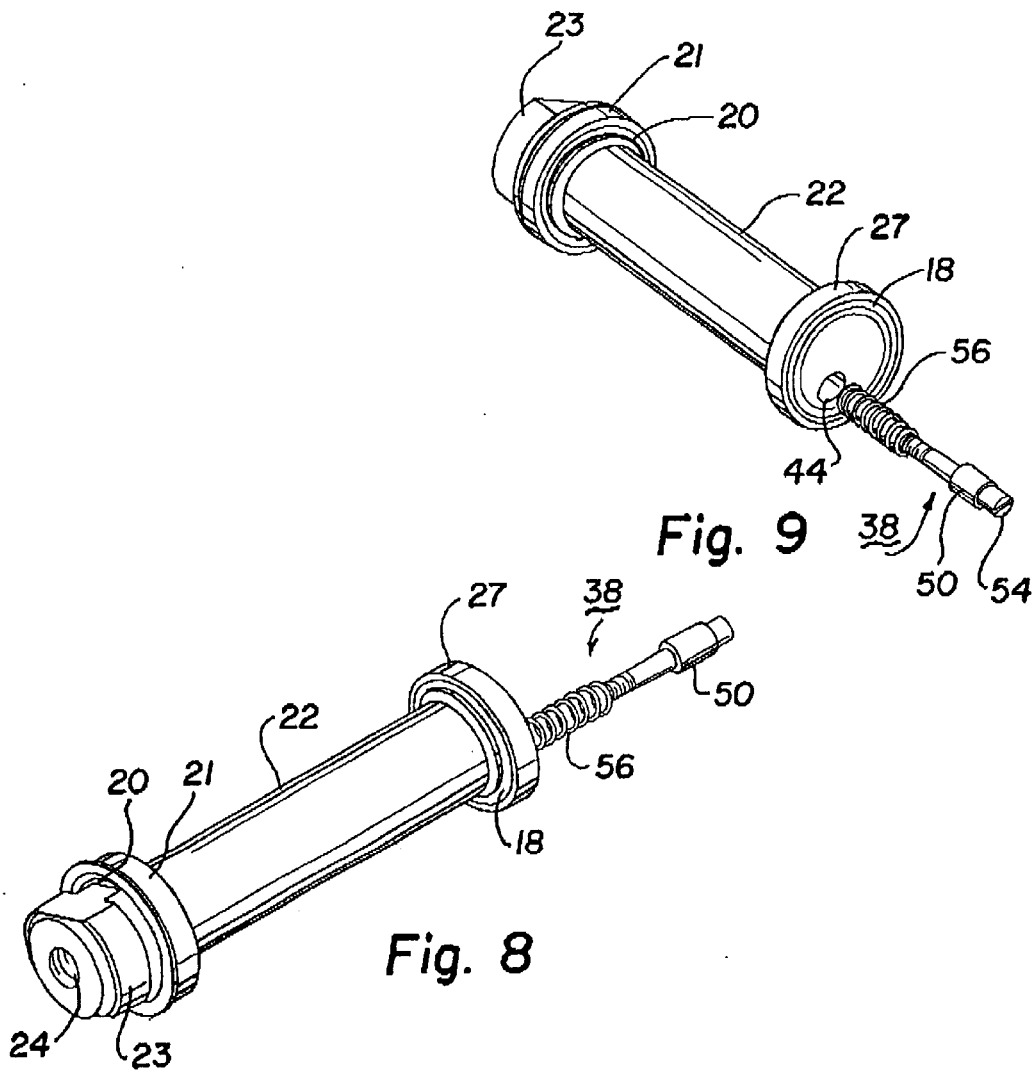

BICYCLE STUNT PEGS FOR GRINDING

FIELD OF THE INVENTION

The field of art to which the invention relates comprises the art of bicycle accessories for use in performing bicycle stunts.

1. Background of the Invention

The stunt of "grinding" is commonly practiced by both adolescents and adults on bicycles. For performing this stunt, a cylindrical peg is secured laterally extending from each of the wheel axles a short distance of about five to six inches. With the bicycle in motion, the rider directs the bicycle so as to ride the pegs up onto an elongated rail of generally circular configuration. After traversing the length of the rail the bicycle leaves the rail and returns to the ground.

2. Description of the Prior Art

The stunt of grinding with a bicycle has been known and participated in at least since about 1993. A choice of fixed pegs are mounted individually to extend laterally on the front and rear axles of the bicycle. Performing this stunt involves riding the bicycle along an above ground elongated cylindrical rail. Since the pegs are non-rotatable, they slide along the rail. The sliding action of such pegs limits both speed and distance, while contributing to excessive wear on both the peg and rail. Typically, such pegs have been constructed of hard metal, such as 52100 chrome moly steel, enabling them to endure much of the imposed wear forces.

A ready solution to overcome the foregoing limitations has not heretofore been known.

OBJECTS OF THE INVENTION

It is therefore an object of the invention to provide novel peg apparatus for bicycles when a person is contemplating participation in the stunt of grinding.

It is the further object of the invention to effect the previous object with pegs capable of providing enhanced speed and distance than available heretofore for performing the stunt of grinding.

It is a still further object of the invention to effect the foregoing objects with a peg construction that affords peg rotation and reduced surface wear in the course of grinding.

SUMMARY OF THE INVENTION

This invention relates to improved peg apparatus for adaptation of a bicycle to the stunt of grinding. More specifically, the invention relates to novel peg construction for use on bicycles so as to afford enhanced grinding performance and reduced wear as compared to such pegs of the prior art.

For achieving the foregoing, the pegs hereof are constructed as a cylindrical unit with the pegs adapted for axle mounting as before. Each peg via a central hub mounts onto the bicycle frame while an outer cover surface includes an annular arcuate recess to receive a cylindrical rail on which grinding is to be conducted. Beyond the recess, the cover surface is knurled for traction.

The unit is supported about each axle of the bicycle while the cover is supported at both ends by ball bearings for rotation about the central hub. The bearings are pressed in place onto the central hub that concentrically receives the axle and are secured in place via retaining rings. The pegs may also include the optional feature of converting the roller pegs to fixed pegs on site by means of a manually actuated detent assembly longitudinally located within a bore of the hub off set from the center line of the axle.

In accordance herewith, the peg construction of the invention affords distinct advantages in the form of enhanced operating performance and reduced wear in the stunt of grinding as compared to peg constructions presently known.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIGS. 6 and 7 are front and rear oriented perspective views respectively of the pegs of the invention; and FIGS. 8 and 9 are views similar to FIGS. 6 and 7 with the exterior cylindrical covers removed.

DESCRIPTION OF THE PREFERRED EMBODIMENTS

Figure 1:
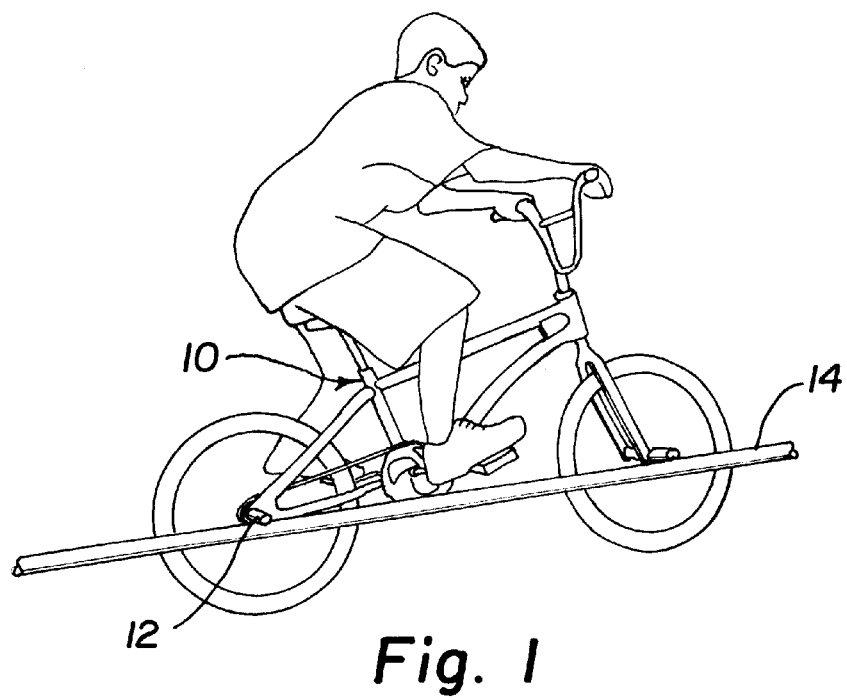
FIG. 1 is a pictorial view of a person participating in the stunt of grinding.

In the description which follows, like parts are marked throughout the specification and drawings with the same reference numerals respectively. The drawing figures are not necessarily to scale and in certain views, proportions may have been exaggerated for purpose of clarity.

Figure 2:
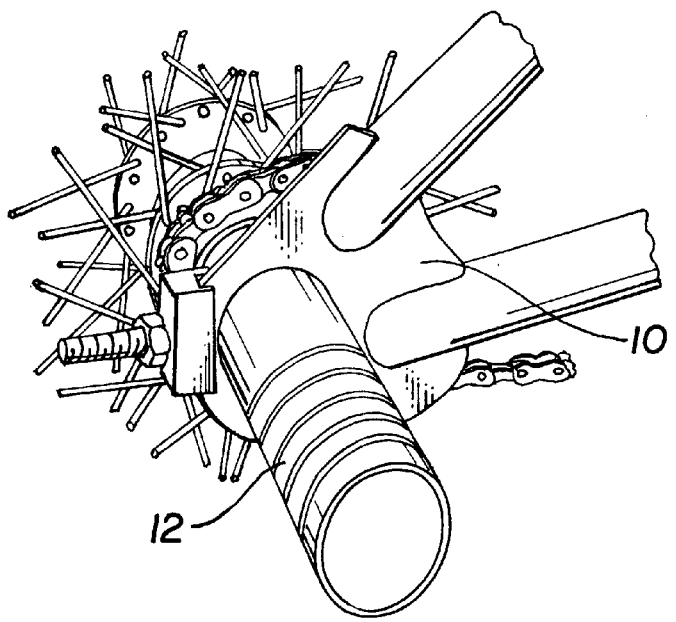
FIG. 2 is a pictorial view of a mounted peg construction as utilized in the prior art.
Figure 3:
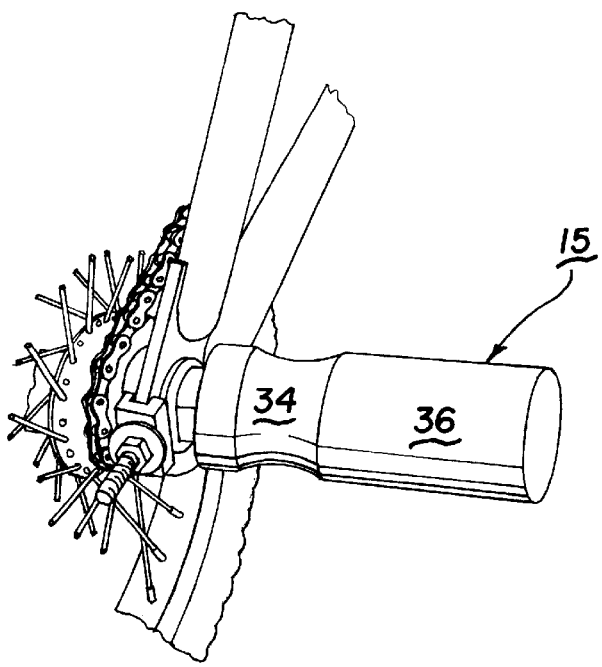
FIG. 3 is a pictorial view of a mounted peg construction in accordance with the invention hereof.

Referring now to FIGS. 1 and 2 of the drawings, there is shown a boy riding a bicycle 10 on which a fixed, non-rotatable peg 12 is laterally connected to both the front and rear axles of the bicycle. As thereshown, the pegs in performance of the stunt, are each positioned so as to commonly engage an elongated rectilinear rail 14 of circular cross section.

The roller peg 15 of the invention, that can be best seen in FIGS. 3–9, is likewise cylindrical and is comprised of a tubular cover 16 of aluminum composition supported via bearings 18 and 20 positioned about a central axle or hub 22. The hub is of generally solid metal construction such as chrome moly steel. At its inboard end hub 22 includes a concentrically threaded bore 24 adapted to receive an extension of threaded wheel axle 26 for mounting the peg against existing bicycle fork or frame 28. A jam nut 30 contiguously behind frame 28 bears against bearing 32 and aids in the support of peg 15 in a cantilevered relation.

Stainless steel retainer ring 21 serves to maintain cover 16 in place while stainless steel retainer ring 27 serves to maintain the position of ball bearings 18.

Optionally included for converting the roller peg hereof on site between a roller peg wherein cover 16 is able to rotate relative to hub 22 to a fixed peg in which cover 16 is prevented from rotation is a detent 38 received longitudinally in hub bore 40 and counter-bore 42. For effecting the fixed peg mode, the distal end 52 of detent 38 extends into cover aperture 44 whereas for operating the peg as a rolling peg, the detent is displaced within bore 40 clear of aperture 44 as will be understood.

Figure 4:
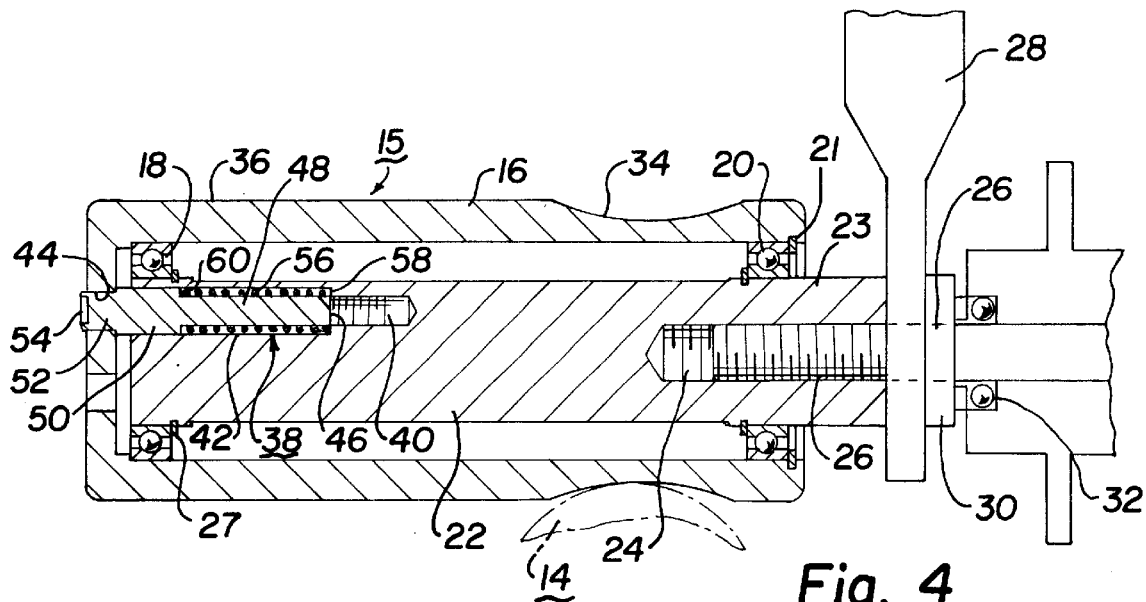
FIG. 4 is a sectional view of the peg of FIG. 3 illustrating mounting of the peg onto an axle of the bicycle.
Figure 5:
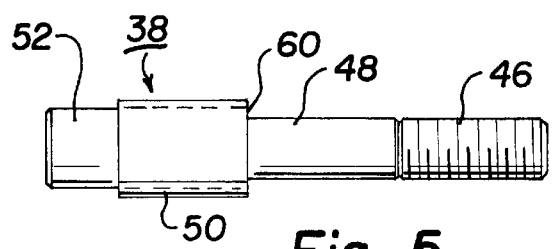
FIG. 5 is an enlarged longitudinal view of the optional detent utilized therein.

Detent 38 is formed of 4340 tool steel and is comprised of an inward threaded shaft end 46 joined to a threaded shaft extension 48. The latter extension, in turn, is joined to an enlarged threaded shaft extension 50 from which there extends a reduced diameter stub 52. Detent 38 is secured, as best seen in FIG. 4, by shaft portions 46 and 50 being threaded into bores 40 and 42 respectively. A stainless steel spring 56 is coiled about shafts 46 and 48 and is maintained compressed between hub shoulder 58 and detent shoulder 60. A screw driver slot recess 54 at the distal end of stub 52 enables threaded displacement of the detent inwardly or outwardly thereat relative to cover aperture 44.

In operation, a peg 15 is headed onto both front and rear bicycle axles 26 until tight in place. With detent 38 located as shown in FIG. 4 and stub 52 penetrating inward of cover aperture 44, cover 16 is prevented from incurring any rolling motion such that the peg operates as a fixed or stationary roller for operating over rail 14 in a manner of the prior art. To convert the peg into the rolling rotational mode, a screw driver (not shown) is inserted in slot 54 to threadedly displace the detent 38 rearwardly at least until stub 52 clears the interior face of the cover behind the opening to aperture 44. With the roller peg in its rotational mode, the stub 52 of the detent is preferably located within and behind the end face of hub 22 thereat. This therefore allows cover 16 to move in a rotational manner about the hub and provide the spinning motion of the cover. Arcuate recess 34 in the cover surface forms a radial undercut in the cover and functions as a guide for the rail during the grinding action. Reversing the position of detent 38 for stub 52 to penetrate inward of aperture 44 reverts operation of the peg to a fixed or stationary mode. A pair of oppositely located balance slots 62 and 64 in cover 16 provide for stationary positioning of the roller cover when used in the fixed mode. Optionally, detent 38 can be omitted whereby the peg 15 continuously operates in the roller mode.

By the above description there is disclosed a novel peg apparatus adapted for mounting onto bicycle axles when participation in the stunt of grinding is contemplated. Unlike the prior art devices that are continously fixed without providing any roller action, the device hereof enjoys the virtue of providing either fixed or roller action as preferred by the user. The roller action, as mentioned supra, affords enhanced operating performance in terms of user satisfaction by readily affording increased travel distance and speed not attainable in a comparable situation with a fixed or stationary peg. The virtues hereof should be readily apparent to those persons participating in the stunt of grinding by affording enhanced results that the participant can readily enjoy and appreciate.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A peg for operating a bicycle in the stunt of grinding, wherein the peg comprises:

an elongated cylindrical unit adapted to be received and laterally supported on a wheel axle of the bicycle with which the peg is to be used, wherein the unit includes a central hub defining a concentrically threaded aperture in which to receive the wheel axle of the bicycle and the cover is bearing mounted for rotation about the hub;

a cover defining the periphery of the unit, the cover being supported for rotation so as to effect a rolling mode when engaging an elongated rail in the course of performing the stunt; and apparatus for converting the peg on site interchangeably between supporting the cover for rotation in the rolling mode and supporting the cover secured against rotation in a fixed mode.

2. A peg in accordance with claim 1 wherein the apparatus comprises a displaceable detent threadedly supported in the hub and the detent is manually displaceable from a first position wherein an end of the detent interlocks the cover against rotation and a second position displaced from the cover so as to permit rotation of the cover.

3. A peg in accordance with claim 2 wherein the hub includes an eccentrically located bore extending longitudinally within the hub and the detent is threadedly contained within the bore for displacement between the first and second positions. inward of the aperture.

4. A peg in accordance with claim 3 wherein the cover includes an aperture opposite the location of the bore and the second position is effected by causing the detent to extend inward of the aperture.

5. A peg for operating a bicycle in the stunt of grinding, wherein the peg comprises:

an elongated cylindrical unit adapted to be received and laterally supported on a wheel axle of the bicycle with which the peg is to be used, wherein the unit includes a central hub defining a concentrically threaded aperture in which to receive the wheel axle of the bicycle and the cover is bearing mounted for rotation about the hub;

a cover defining the periphery of the unit, the cover being supported for rotation so as to effect a rolling mode when engaging an elongated rail in the course of performing the stunt and including an annular recess in the periphery of the cover for engaging a rail in the course of performing the stunt; and apparatus for converting the peg on site interchangeably between supporting the cover for rotation in the rolling mode and supporting the cover secured against rotation in a fixed mode.

6. A peg in accordance with claim 5, wherein at least a portion of the remainder of the cover periphery beyond the recess includes a knurled finish.

* * * * *